United States Patent
Nakamura et al.

[11] Patent Number: 5,867,376
[45] Date of Patent: Feb. 2, 1999

[54] DC MAGNETIZATION SUPPRESSION IN POWER CONVERTER TRANSFORMERS

[75] Inventors: Fuminori Nakamura; Shinzo Tamai; Sadao Funahashi, all of Tokyo, Japan

[73] Assignee: Mitsubishi Denki Kabushiki Kaisha, Tokyo, Japan

[21] Appl. No.: 908,308

[22] Filed: Aug. 7, 1997

[30] Foreign Application Priority Data

Aug. 8, 1996 [JP] Japan .................................. 8-210016

[51] Int. Cl.⁶ .................................................. H02M 7/48
[52] U.S. Cl. ........................ 363/56; 363/95; 363/132; 363/136
[58] Field of Search .................... 363/40, 41, 55, 363/560, 57, 58, 95, 96, 97, 98, 131, 132, 135, 136, 137

[56] References Cited

U.S. PATENT DOCUMENTS

| | | | |
|---|---|---|---|
| 4,439,822 | 3/1984 | Cocconi | 363/56 |
| 4,803,611 | 2/1989 | Sashida et al. | 363/98 |
| 5,012,400 | 4/1991 | Yasuda | 363/95 |
| 5,177,428 | 1/1993 | Hirose et al. | 363/58 |
| 5,450,310 | 9/1995 | Kawakami | 363/96 |

FOREIGN PATENT DOCUMENTS

| | | | |
|---|---|---|---|
| 0 361 389 | 8/1993 | European Pat. Off. | H02M 7/48 |
| 0 680 134 | 11/1995 | European Pat. Off. | H02M 1/06 |
| 4013171 | 1/1992 | Germany | H02M 7/48 |
| 62-207173 | 9/1987 | Japan | H02M 7/48 |
| 2-307374 | 12/1990 | Japan | H02M 7/537 |
| 3-139175 | 6/1991 | Japan | H02M 7/48 |
| 4-004756 | 1/1992 | Japan | H02M 7/48 |
| 5-236761 | 9/1993 | Japan | H02M 7/515 |
| 7-298637 | 11/1995 | Japan | H02M 7/537 |

*Primary Examiner*—Jeffrey Sterrett
*Attorney, Agent, or Firm*—Sughrue, Mion, Zinn, Macpeak & Seas, PLLC

[57] ABSTRACT

A power converting apparatus includes a power converter connected to a power line via a transformer 3, and current detectors 5A and 5B for detecting the currents of the windings of the transformer. The output signals of the current detectors 5A and 5B are mathematically processed to produce an exciting current component of a transformer 3. The exciting current component is mathematically processed to produce a flux density contained DC component. Further, the flux density contained DC component and a flux density contained DC component command value are mathematically processed to produce a voltage command correction value.

4 Claims, 6 Drawing Sheets

DC MAGNETIZATION SUPPRESSION IN POWER CONVERTER TRANSFORMERS

BACKGROUND OF THE INVENTION

The present invention relates to an electric power converting apparatus having a power converter connected to an AC power system and loads by way of a transformer, and more particularly to a technique for preventing a DC magnetization in the transformer.

FIG. 9 schematically shows an arrangement of a conventional power converting apparatus having a power converter connected to an AC power system via a transformer. A circuit for preventing a DC magnetization in the transformer is incorporated into the power converting apparatus. The power converting apparatus is disclosed in Japanese Patent Laid-Open Publication No. Hei. 7-28534.

In FIG. 9: reference numeral 1 is an AC power system as an AC power line; 2 is a self-excited converter for generating an AC voltage in response to a gate drive signal; 3 is a transformer inserted between the AC power system 1 and the self-excited converter 2; 4 is a DC voltage source for supplying a DC voltage to the self-excited converter 2; 5A and 5B are current detectors for detecting currents flowing through the windings of the transformer 3; 6 is a subtractor for computing a difference between the currents output from the current detectors 5A and 5B; 7 is a DC component detector for detecting a DC component of an output signal of the subtractor 6; 8 is a potential transformer which measures the voltage of the AC power system 1; 9 is a voltage reference circuit for producing a set voltage of the AC power system 1; 10 is a voltage command value generating circuit for generating a voltage command value to the self-excited converter 2 in accordance with the output signals of the voltage reference circuit 9 and the potential transformer 8; 11 is an adder for adding together an output signal of the DC component detector 7 and an output signal of the voltage command value generating circuit 10; 12 is a PWM (pulse width modulation) control circuit which determines an ignition timing of a self-extinction element in the self-excited converter 2 in accordance with the output signal of the adder 11, and generates a gate pulse on the basis of the determined timing; and 13 is a gate pulse amplifying circuit which amplifies an output signal of the PWM control circuit 12 and applies a gate drive signal to the self-excited converter 2.

An operation of the conventional power converting apparatus shown in FIG. 9 will be described.

In the power converting apparatus of FIG. 9, when a DC component is contained in the voltage of the AC power system 1 or the-output voltage of the self-excited converter 2, an exciting current containing the DC component flows into the transformer 3. The DC component contained in the exciting current magnetizes the transformer 3 to saturate the iron core of the transformer 3.

Of the winding currents of the transformer 3, the current flowing through the winding connected to the AC power system 1 is called a primary winding current, and the current flowing through the winding connected to the self-excited converter 2 is called a secondary winding current. An exciting current of the transformer 3 can be obtained by computing a difference between the primary winding current of the transformer 3 detected by the current detector 5A and the secondary winding current detected by the current detector 5B by the subtractor 6. The DC component contained in the exciting current, which will magnetize the iron core of the transformer 3, is obtained from the DC component detector 7 which is for detecting a DC component of the output signal of the subtractor 6.

The DC component of the exciting current, thus detected, is applied to the adder 11. The adder adds together the DC component and a voltage command value that is generated by the voltage command value generating circuit 10 in accordance with the output signals of the potential transformer 8 and the voltage reference circuit 9, and applied to the self-excited converter 2. The resultant signal output from the adder is used as a signal representative of a voltage-command-value correction value.

The PWM control circuit 12 forms a gate pulse signal in accordance with the output signal of the adder 11, and the gate pulse amplifying circuit 13 processes the gate pulse signal from the adder to form a gate drive signal. The gate drive signal is applied to the self-excited converter 2. In response to the gate drive signal, the self-excited converter 2 switches self-extinction elements contained therein in accordance with the output voltage of the DC voltage source 4, and produces a voltage corresponding to the output signal of the adder 11.

As described above, in the prior art power converting apparatus shown in and described referring to FIG. 9, the self-excited converter 2 produces a voltage corresponding to the output signal of the adder 11. Therefore, when a DC component is contained in the voltage of the AC power system 1 or the output voltage of the self-excited converter 2, the power converting apparatus operates in the following manner. That is, a DC component contained in the exciting current of the transformer 3 is detected, and applied to the adder 11. The self-excited converter 2 produces a voltage, which cancels the DC component contained in the voltage of the AC power system 1 or the output voltage of the self-excited converter 2, whereby to eliminate the DC magnetization of the transformer 3.

The prior art power converting apparatus constructed as mentioned above detects an exciting current of the transformer 3, and causes the self-excited converter 2 to produce a voltage corresponding to the detected exciting current. Therefore, a DC component contained in the detected exciting current of the transformer 3 is proportional to an output signal of the self-excited converter 2 which is representative of a voltage-command-value correction value for suppressing the DC magnetization.

A nonlinear correlation is generally present between an exciting current of the transformer 3 and a flux density of the iron core of the transformer 3, as shown in FIG. 10. A linear relation, expressed by a first order integration as given by an equation (1), is present between a voltage applied to the transformer 3 and a flux density of the iron core of the transformer 3. Therefore, a voltage to be output by the self-excited converter 2 when it receives the DC component of the detected exciting current must correspond to the exciting current/flux density relationship shown in FIG. 10.

Magnetic flux = $\{\int(\text{applied voltage})dt\}/$              (1)

{(number of turns of the transformer winding)/(core cross sectional area)}

The conventional power converting apparatus does not include means for compensating for the nonlinear relationship between the exciting current and the magnetic flux of the transformer 3. Therefore, it is impossible to coincide the voltage of the self-excited converter 2 with the voltage necessary for suppressing the DC magnetization over the entire range of the flux density. Particularly in a flux density region where the DC magnetization in the transformer is large and at a point near to its saturation point, the difference between those voltages is great. Under this condition, it is difficult to sufficiently suppress the DC magnetization in the transformer.

The publication referred to above describes one of the solutions to the above problem. In the solution, a magnetic flux of the iron core of the transformer is directly detected by use of a Hall element. To this end, it is necessary to specially design and manufacture a transformer with the Hall element incorporated thereinto. To incorporate the Hall element into the transformer already assembled into the apparatus, it is necessary to alter the transformer. Sometimes, it is impossible to practically incorporate the Hall element into the transformer. If possible, its incorporation needs high cost and much time. As the size of the transformer becomes large, it is more difficult to incorporate the Hall element into the apparatus.

SUMMARY OF THE INVENTION

The present invention is made to solve the above problem, and has an object to provide a power converting apparatus which is easily realized and can suppress the DC magnetization in the transformer irrespective of a quantity of the DC magnetization.

According to the present invention, a power converting apparatus for outputting a voltage in accordance with an output voltage command value, comprises: a power converter connected to a power line via a transformer; current detectors for detecting the currents of the windings of the transformer; an exciting current computing circuit for mathematically processing the output signals of the current detectors to produce an exciting current component of the transformer; a flux density computing circuit for mathematically processing an output signal of the exciting current computing circuit to produce a flux density of the transformer; a flux density contained DC component computing circuit for mathematically processing an output signal of the flux density computing circuit to produce a DC component contained in the output signal; and a voltage command correction value computing circuit for mathematically processing an output signal of the flux density contained DC component computing circuit and a flux density contained DC component command value to produce a voltage command value correction value; whereby the power converting apparatus produces a voltage dependent on the output voltage command value and the voltage command correction value. With such a construction, the nonlinear relationship between the exciting current and the flux density of the transformer is compensated for without directly detecting the magnetic flux. Therefore, a reliable suppressing of the DC magnetization in the transformer is secured.

Furthermore, in the power converting apparatus, the flux density computing circuit includes a magnetic field computing circuit for mathematically processing an output signal of the exciting current computing circuit, to thereby produce a magnetic field developed from the transformer, and a magnetic field—flux density computing circuit for mathematically processing an output signal of the magnetic field computing circuit to produce a flux density of the transformer. Therefore, the mathematical processing of the exciting current output signal to produce a flux density is easy and reliable.

Furthermore, in the power converting apparatus, the flux density computing circuit includes a memory table for storing in advance the correspondence between the exciting current and the flux density, and a table referring circuit for reading out a flux density specified by an output signal of the exciting current computing circuit from the memory table. Therefore, the mathematical processing of the exciting current output signal to produce a flux density is easy and reliable.

Furthermore, according to the present invention, a power converting apparatus for outputting a voltage in accordance with an output voltage command value, comprises: a power converter connected to a power line via a transformer; voltage detectors for detecting the voltages of the windings of the transformer; a flux density contained DC component computing circuit for mathematically processing a difference between the output signals of the voltage detectors to produce a flux density contained DC component of the transformer; and a voltage command correction value computing circuit for mathematically processing an output signal of the flux density contained DC component computing circuit and a flux density contained DC component command value to produce a voltage command value correction value; whereby the power converting apparatus produces a voltage dependent on the output voltage command value and the voltage command correction value. With such a construction, the nonlinear relationship between the exciting current and the flux density of the transformer is compensated for without directly detecting the magnetic flux. Therefore, a reliable suppressing of the DC magnetization in the transformer is secured.

DETAILED DESCRIPTION OF THE PREFERRED EMBODIMENTS

First Embodiment

Figure 1:
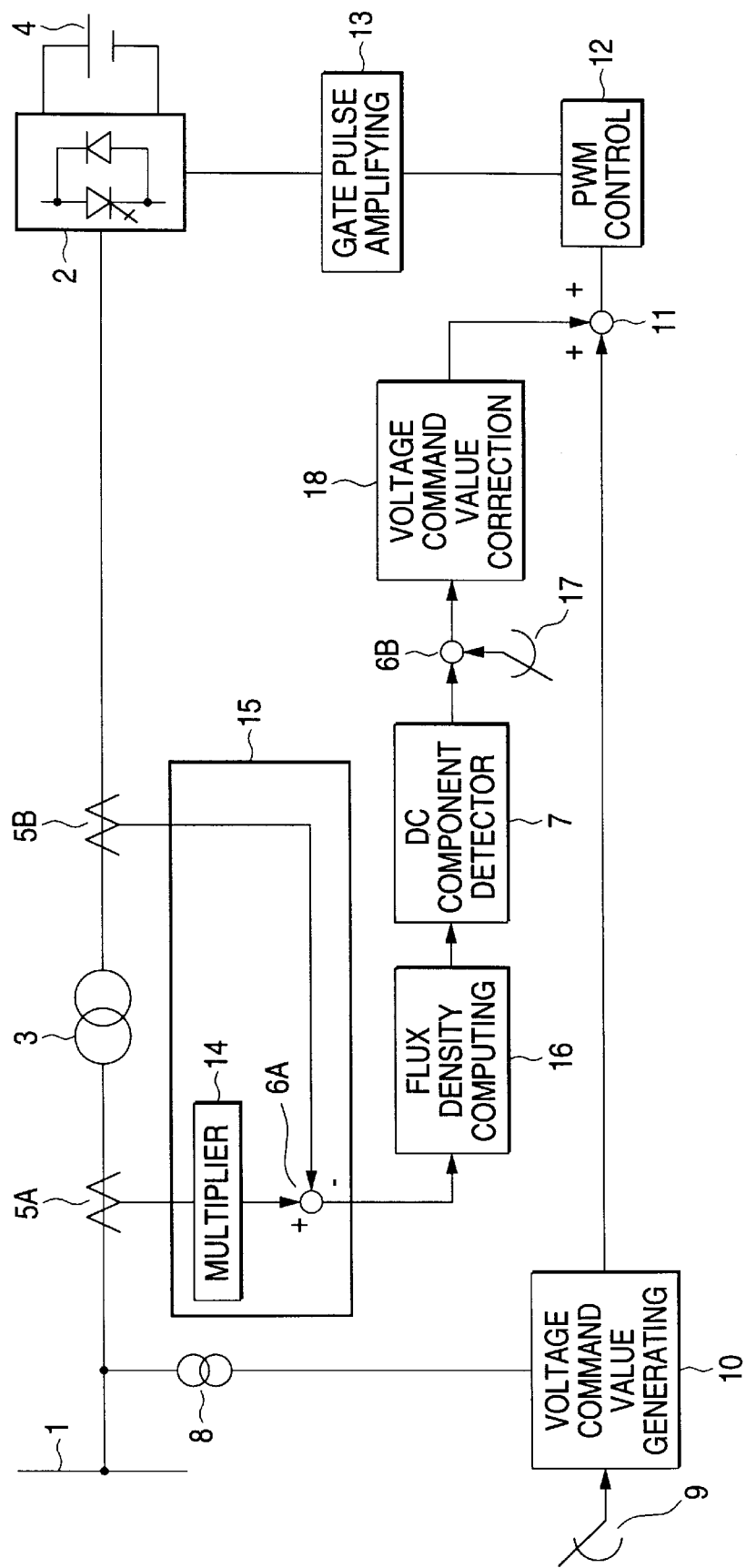
FIG. 1 is a block diagram schematically showing a power converting apparatus according to an embodiment 1 of the present invention.

A power converting apparatus according to an embodiment 1 of the present invention will be described with reference to FIG. 1 schematically showing the converting apparatus.

Figure 9:
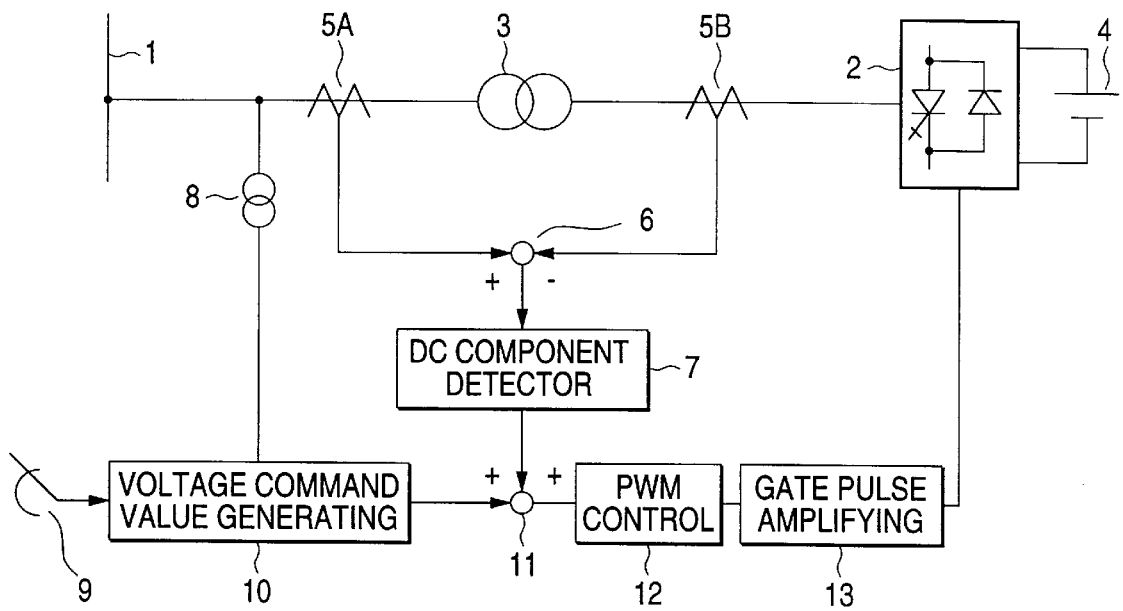
FIG. 9 is a block diagram schematically showing a conventional power converting apparatus.
Figure 10:
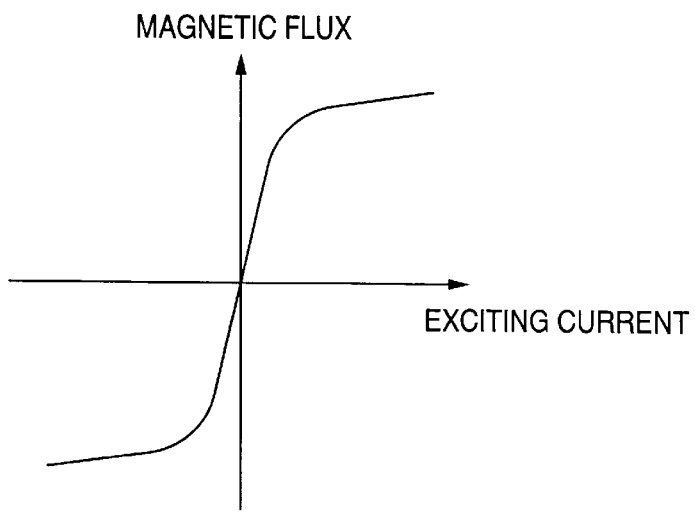
FIG. 10 is a graph showing a relationship between an exciting current and a flux density of an iron core of a transformer.

Like or equivalent portions are designated by like reference numerals in FIG. 9 showing the conventional power converting apparatus, for simplicity.

In FIG. 1: reference numeral 14 is a multiplier for multiplying the output signal of the current detector 5A by a coefficient that depends on a ratio of the number of turns of the primary winding of the transformer 3 and the number of turns of the secondary winding; 15 is an exciting current computing circuit including a subtractor 6A and the multiplier 14; 16 is a flux density computing circuit for mathematically processing an output signal of the subtractor 6A to produce a flux density of the transformer 3; 17 is a flux density contained DC component command value setting circuit for producing a flux density contained DC component command value; 6B is a subtractor 6B; and 18 is a voltage command value correction value computing circuit for computing a voltage command correction value.

Figure 2:
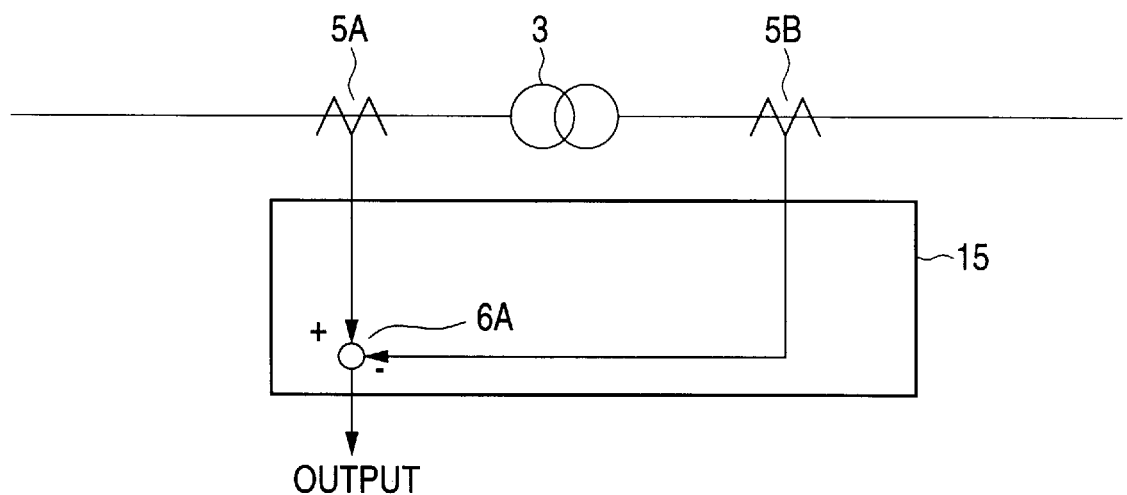
FIG. 2 is a circuit diagram showing another construction of an exciting current computing circuit 15 in the power converting apparatus of FIG. 1.
Figure 3:
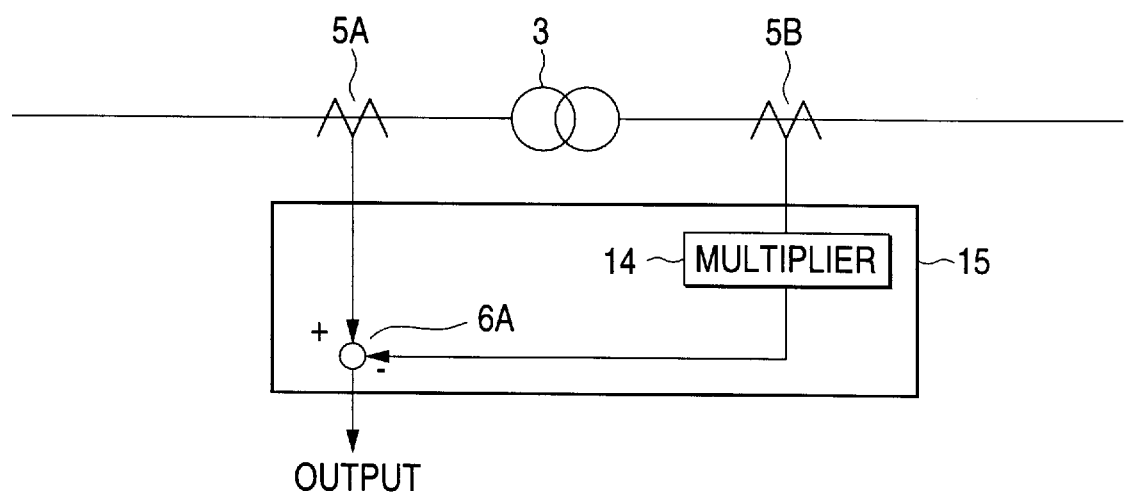
FIG. 3 is a circuit diagram showing yet another construction of the exciting current computing circuit 15 in the power converting apparatus of FIG. 1.
Figure 4:
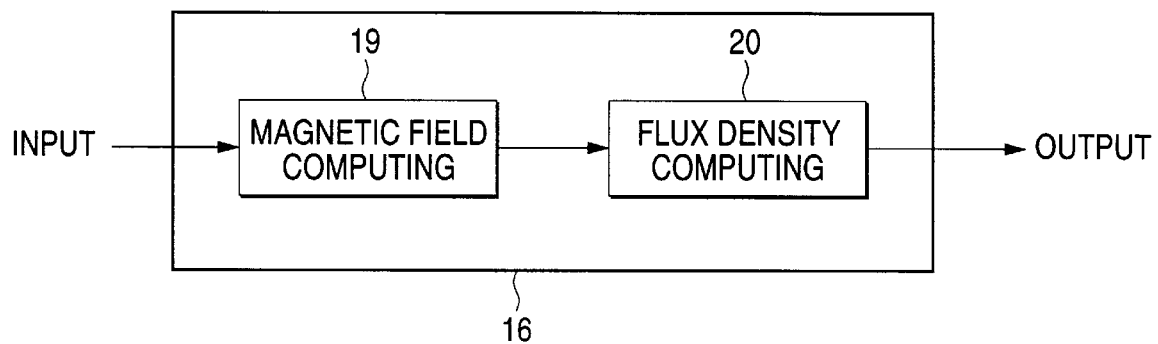
FIG. 4 is a block diagram showing the detail of a flux density computing circuit 16 in the apparatus of FIG. 1.
Figure 5:
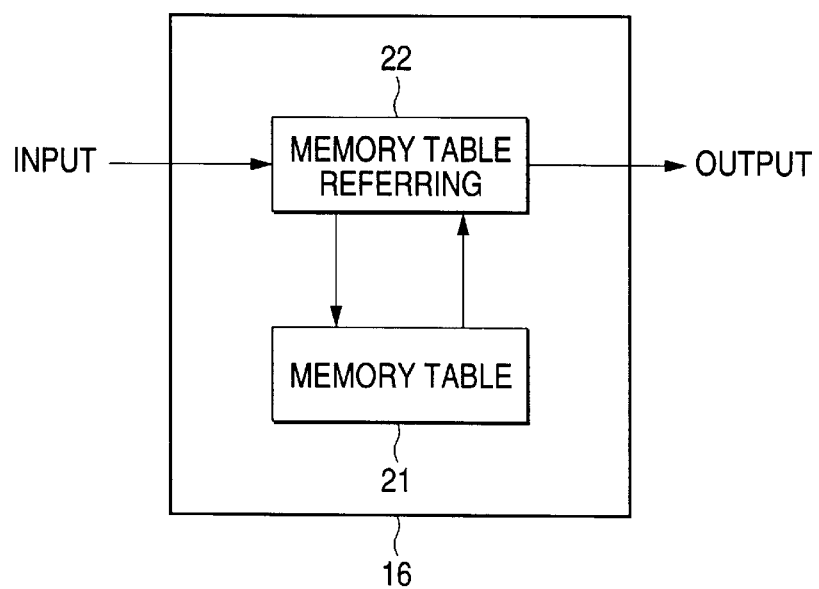
FIG. 5 is a block diagram showing another construction of the flux density computing circuit 16 in the apparatus of FIG. 1.

FIGS. 2 and 3 show other constructions of the exciting current computing circuit 15, which will subsequently be described in detail. FIGS. 4 nd 5 show constructions of the flux density computing circuit 16. In FIG. 4, reference numeral 19 designates a magnetic field computing circuit for mathematically processing an exciting current to produce a magnetic field, and numeral 20 indicates a magnetic field→flux density computing circuit for computing a magnetic flux density using a magnetic field. In FIG. 5, numeral 21 represents a memory table for storing the correspondence between the exciting current and the flux density, and numeral 22 stands for a table referring circuit which refers to the memory table 21 and reads out a flux density specified by an input signal received thereby, from the memory table 21.

The operation of the thus constructed power converting apparatus will be described.

A primary winding current of the transformer 3 is detected by the current detector 5A, and a secondary winding current of the same is detected by the current detector 5B. The multiplier 14 multiplies an output signal of the current detector 5A by a coefficient 1, given by an equation (2), which is dependent on a ratio of the number of turns of the primary winding of the transformer 3 and the number of turns of the secondary winding.

Coefficient 1 = (number of turns of the primary winding)/     (2)

(number of turns of the secondary winding)

A difference between the output signal of the multiplier 14 and the output signal of the current detector 5B, produced by the subtractor 6A is an exciting current of the transformer 3. Exciting current detecting means including the multiplier 14 and the subtractor 6A is used as the exciting current computing circuit 15 of the present invention.

When the ratio of the numbers of turns of the primary and secondary windings is 1, the coefficient 1 in the equation (2) is 1. Therefore, in this case, the multiplier 14 is omissible. The exciting current computing circuit 15 where the multiplier 14 is omitted may be depicted as shown in FIG. 2.

In the exciting current computing circuit shown in FIG. 1, the multiplier 14 is located between the current detector 5A and the subtractor 6A. As shown, the output signal of the current detector 5B may be multiplied by a coefficient 2 given by an equation (3), in the multiplier 14.

Coefficient 2 = (number of turns of the secondary winding)/     (3)

(number of turns of the primary winding)

The flux density computing circuit 16 mathematically processes an exciting current of the transformer 3 as an output signal of the subtractor 6A, to thereby produce a magnetic flux density of the iron core of the transformer 3. Examples of the constructions of the flux density computing circuit 16 are shown in FIGS. 4 and 5.

In FIG. 4, a magnetic field computing circuit 19 mathematically processes the output signal of the subtractor 6A as the exciting current of the transformer 3 according to an equation (4), to thereby produce a magnetic field developed from the winding of the transformer 3.

Magnetic field = (number of turns of transformer 3) *     (4)

(exciting current)/(magnetic path length of transformer 3)

The magnetic field→flux density computing circuit 20 produces a flux density by mathematically processing a magnetic field developed from the windings of the transformer 3 that is computed by the magnetic field computing circuit 19. An example of the method of computing the flux density is known as described in "Theory of Ferromagnetic Hysterisis" in "Journal of Magnetism and Magnetic Materials" 61'86, pp 48 to 60. Hence, no description on it will be given here.

In the flux density computing circuit 16 shown in FIG. 5, the correspondence between the exciting current and the flux density of the transformer 3 is obtained by an experiment or a theoretical computation, and is stored in a memory of the computer, and read out when necessary.

In FIG. 5, the correspondence between the exciting current and the flux density is stored in advance in the memory table 21. The table referring circuit 22 reads a flux density specified by the exciting current of the transformer 3 as the output signal of the subtractor 6A from the memory table 21, and outputs it to the DC component detector 7.

A DC component contained in the thus detected flux density of the iron core of the transformer 3 is detected by the DC component detector 7. The DC component detector 7 is a detector for extracting only a DC component from an AC signal containing the DC component. The detector may be constructed with a low-pass filter, an integrator, a moving average filter or the like.

The output signal of the DC component detector 7 is a feedback value of the flux density contained DC component. A difference between it and the output signal of the flux density contained DC component command value setting circuit 17 is calculated by the subtractor 6B, and is applied to the adder by way of the voltage command correction value computing circuit 18, whereby to form a feedback control system. Through the feedback control system, the flux density contained DC component of the transformer 3 may be made to coincide with the flux density contained DC component command value. If the flux density contained DC component command value is set at 0, the voltage command correction value computing circuit 18 outputs a voltage command correction value necessary for reducing the DC magnetization in the transformer 3 to zero.

The nonlinear characteristic between the exciting current and the magnetic flux of the transformer 3 is compensated for by the flux density computing circuit 16. Accordingly, a relation between a flux density of the transformer 3 and a voltage for exciting the transformer 3 is expressed by a linear relation given by an equation (5). By using a linear feedback control system including the voltage command correction value computing circuit 18 constructed with a linear controller, such as a PID controller based on proportion, integration and differentiation, the DC magnetization in the transformer 3 can be sufficiently suppressed without any degradation of the control characteristic caused by the nonlinear exciting characteristic of the transformer 3.

Exciting voltage = (5)

(number of turns) * (core cross sectional area) * d(flux density)/dt.

A voltage command correction value thus formed by the voltage command correction value computing circuit 18 is added, by the adder 11, to an output voltage command value to the self-excited converter 2, which is formed on the basis of the output signal of the potential transformer 8 and the output signal of the voltage reference circuit 9 in the voltage command value generating circuit 10. The resultant signal is used as a voltage command correction value to the self-excited converter 2.

In the embodiment 1, the combination are used for forming the voltage command value in the voltage command value generating circuit 10. A combination of a power reference and a power feedback value or a combination of a current reference and a current feedback value may be substituted for the above output voltage combination.

In the power converting apparatus, the PWM control circuit 12 generates a gate pulse signal in accordance with an output signal of the adder 11, and the gate pulse amplifying circuit 13 generates a gate drive signal in response to the gate pulse signal. The gate drive signal is applied to the self-excited converter 2. The self-excited converter 2 switches the self-extinction element, such as gate-turn-off thyristors and transistors, to thereby produce a voltage corresponding to the output signal of the adder 11.

The embodiment 1 uses the self-excited converter 2 for a power converter to produce a voltage in accordance with the output signal of the adder 11. The power converter may be any type of converter if it is able to produce a voltage in accordance with a voltage command. An example of such a power converter is a thyristor power converter.

As described above, the conventional power converting apparatus shown in FIG. 9 does not include the flux density computing circuit 16 as an element for compensating for the nonlinear relation between the exciting current and the flux density of the transformer 3. Therefore, the conventional power converting apparatus cannot make the output voltage of the self-excited converter 2 coincident with the voltage necessary for suppressing the DC component over the entire range of flux density. Particularly in a flux density region where the DC magnetization in the transformer is large and at a point near to its saturation point, the difference between the voltages is great. Under this condition, it is difficult to sufficiently suppress the DC magnetization in the transformer. The power converting apparatus of the embodiment 1 shown in FIG. 1 mathematically processes an exciting current of the transformer 3 in the flux density computing circuit 16 to produce a flux density of the iron core of the transformer, whereby the nonlinear relation between the exciting current and the flux density of the transformer 3 is compensated for. When a DC component is contained in the voltage of the AC power system 1 or the output voltage of the self-excited converter 2, the self-excited converter 2 appropriately produces a voltage necessary for canceling the DC component contained in that voltage, to thereby suppress the DC magnetization in the transformer 3.

In the embodiment 1, since there is no need of directly detecting a magnetic flux of the iron core of the transformer 3, any alteration is not required for the transformer 3 of the hardware, and the construction of the DC magnetization suppressing circuit is simple.

Second Embodiment

Figure 6:
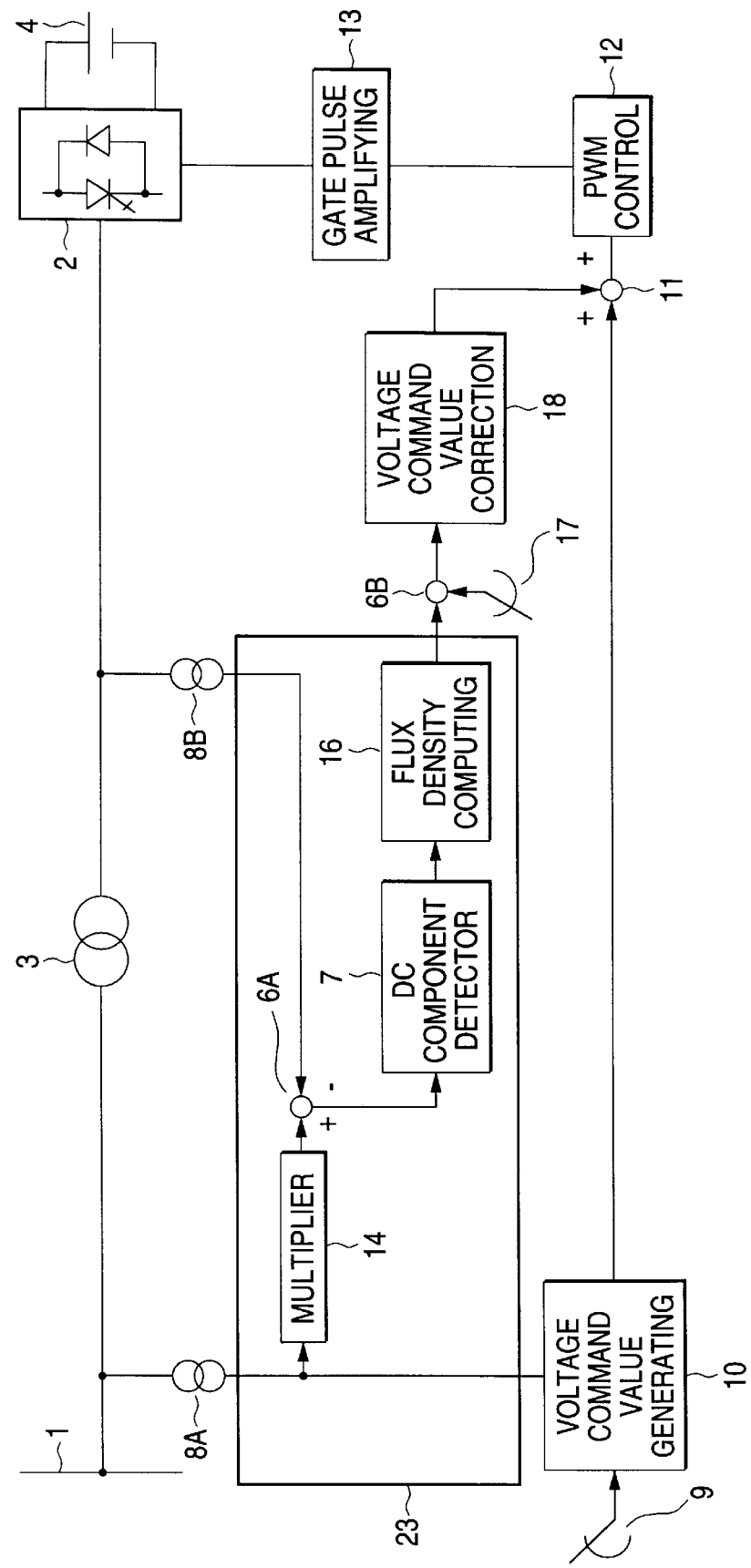
FIG. 6 is a block diagram schematically showing a power converting apparatus according to an embodiment 2 of the present invention.

FIG. 6 is a block diagram schematically showing an embodiment 2 of the present invention. In FIG. 6, reference numeral 23 designates a flux density contained DC component computing circuit for computing a flux density contained DC component of the transformer 3.

The operation of the present embodiment will be described. The embodiment 2 is different from the embodiment 1 in that the current detectors 5A and 5B are replaced with potential transformers 8A and 8B for computing a flux density of the iron core of the transformer 3.

The potential transformer 8A detects a voltage of the AC power system 1, and another potential transformer 8B detects an output voltage of the self-excited converter 2. The multiplier 14 multiplies the output signal of the potential transformer 8A is multiplied by a coefficient 3, given by an equation (6), which dependent on a ratio of the number of turns of the primary winding of the transformer 3 and the number of turns of the secondary winding.

Coefficient 3 = (number of turns of the secondary winding)/ (6)

(number of turns of the primary winding)

The subtractor 6A arithmetically processes the output signal of the multiplier 14 and the output signal of the potential transformer 8B to produce a difference therebetween. The difference is a called impedance voltage of the transformer 3. The impedance voltage is a perfect AC component in a normal state of the transformer 3. When it is averaged, the result is 0. When the iron core of the transformer 3 is DC magnetized, the averaging of the impedance voltage produces a voltage, not zero, as an average value. The DC component detector 7 detects the average value, or a DC component.

The flux density computing circuit 16 stores know various parameters, such as the number of turns of each winding of the transformer 3, % impedance, and the iron core cross sectional area. The circuit 16 integrates an output signal of the DC component detector 7 by using those parameters, to produce a flux density contained DC component of the transformer 3.

The result of the computation by the flux density computing circuit 16 is input to the subtractor 6B. The subsequent operations of the embodiment 2 is the same as of the embodiment 1, and hence description of it will be omitted.

Figure 7:
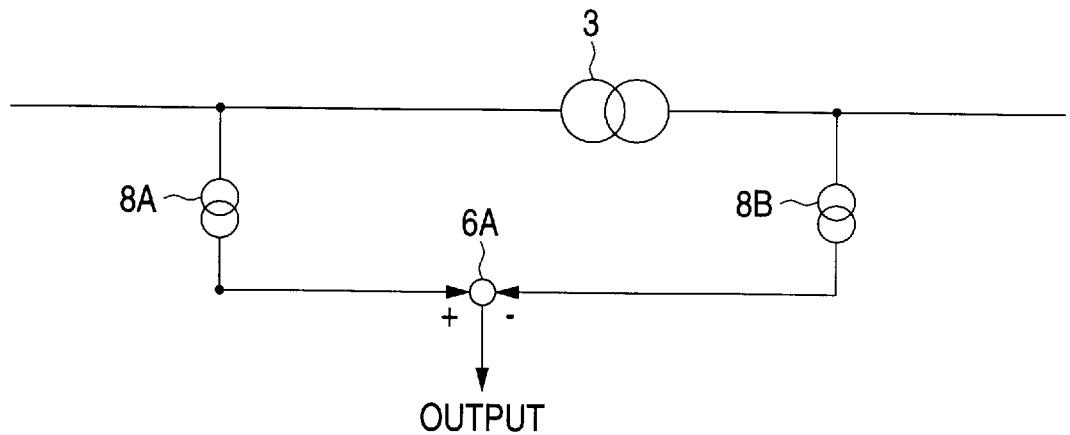
FIG. 7 is a circuit diagram showing another construction of a voltage difference detecting portion in the apparatus of FIG. 6.

When the ratio of the numbers of turns of the primary and secondary windings is 1, the coefficient 3 is 1. Therefore, in this case, the multiplier 14 is omissible. The flux density contained DC component computing circuit 23 where the multiplier 14 is omitted may be depicted as shown in FIG. 7.

Figure 8:
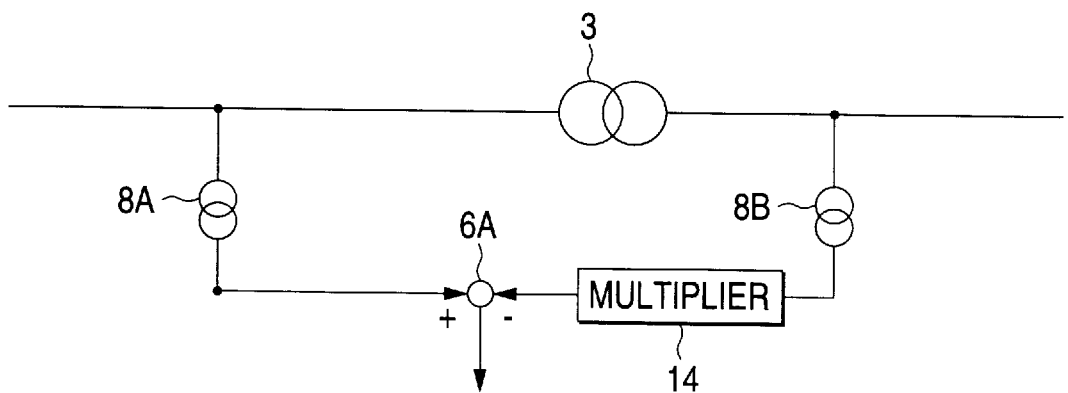
FIG. 8 is a circuit diagram showing yet another construction of a voltage difference detecting portion in the apparatus of FIG. 6.

In the circuit of FIG. 6, the multiplier 14 is inserted between the potential transformer 8A and the subtractor 6A. As shown in FIG. 8, the output signal of the potential transformer BE may be multiplied by a coefficient 4 given by an equation (7).

Coefficient 4 = (number of turns of the primary winding)/ (7)

(number of turns of the secondary winding)

In the FIG. 6 circuit, the DC component detector 7 arithmetically processes the output signal of the subtractor 6A to produce a DC component contained therein, and then the flux density computing circuit 16 integrates the resultant to produce a flux density contained DC component. The above computing procedural order may be reversed. That is, the output signal of the subtractor 6A is first integrated and then the DC component is computed to obtain the flux density contained DC component.

In the second embodiment, the output signal of the potential transformer BA is arithmetically processed to produce a flux density contained DC component of the transformer 3, without not detecting the exciting current of the transformer, whereby a voltage command correction value can be obtained free from the adverse effect by the nonlinear relationship between the exciting current and the flux density of the transformer 3. Therefore, the DC magnetization in the transformer 3 can be suppressed properly.

Any alteration is not required for the transformer 3 of the hardware since there is no need of directly detecting a magnetic flux of the iron of the transformer 3. Accordingly, the construction of the DC magnetization suppressing circuit is simple.

What is claimed is:

1. A power converting apparatus for outputting a voltage in accordance with an output voltage command value, comprising:

a power converter connected to a power line via a transformer;

current detectors for detecting the currents of the windings of said transformer;

an exciting current computing circuit for mathematically processing the output signals of said current detectors to produce an exciting current component of said transformer;

a flux density computing circuit for mathematically processing an output signal of said exciting current computing circuit to produce a flux density of said transformer;

a flux density contained DC component computing circuit for mathematically processing an output signal of said flux density computing circuit to produce a DC component contained in said output signal; and a voltage command correction value computing circuit for mathematically processing an output signal of said flux density contained DC component computing circuit and a flux density contained DC component command value to produce a voltage command value correction value;

whereby said power converting apparatus produces a voltage dependent on said output voltage command value and said voltage command correction value.

2. A power converting apparatus according to claim 1, wherein said flux density computing circuit includes:

a magnetic field computing circuit for mathematically processing an output signal of said exciting current computing circuit, to thereby produce a magnetic field developed from said transformer, and a magnetic field→flux density computing circuit for mathematically processing an output signal of said magnetic field computing circuit to produce a flux density of said transformer.

3. A power converting apparatus according to claim 1, wherein said flux density computing circuit includes:

a memory table for storing in advance the correspondence between the exciting current and the flux density, and a table referring circuit for reading out a flux density specified by an output signal of said exciting current computing circuit from said memory table.

4. A power converting apparatus for outputting a voltage in accordance with an output voltage command value, comprising:

a power converter connected to a power line via a transformer;

voltage detectors for detecting the voltages of the windings of said transformer;

a flux density contained DC component computing circuit for mathematically processing a difference between the output signals of said voltage detectors to produce a flux density contained DC component of said transformer; and a voltage command correction value computing circuit for mathematically processing an output signal of said flux density contained DC component computing circuit and a flux density contained DC component command value to produce a voltage command value correction value;

whereby said power converting apparatus produces a voltage dependent on said output voltage command value and said voltage command correction value.

* * * * *